J. B. JONES.
Car-Starters.
No. 135,920. Patented Feb. 18, 1873.
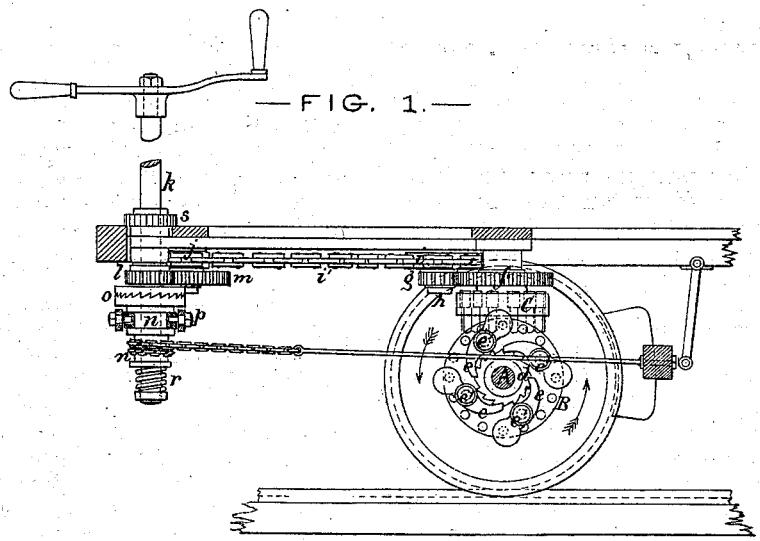
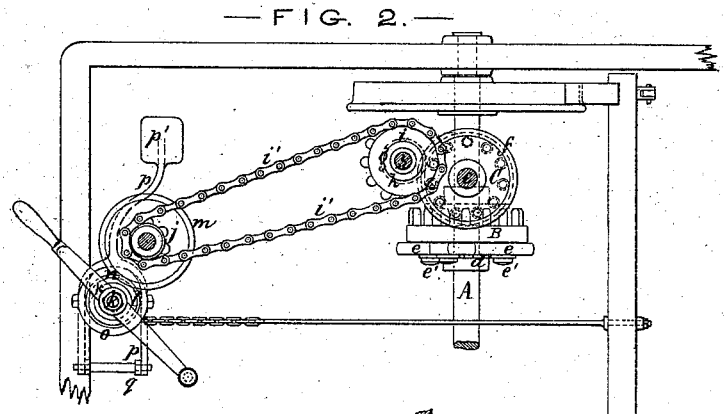
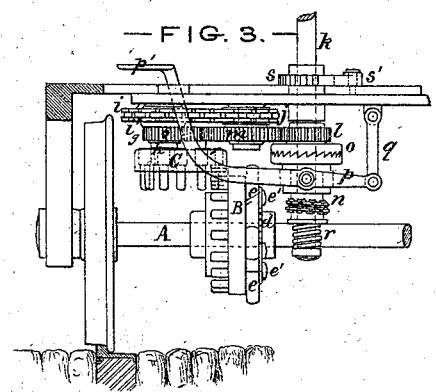
Witnesses:
Theodore Bergner
Thos. J. Collins
Inventor:
Joseph B. Jones

UNITED STATES PATENT OFFICE.

JOSEPH B. JONES, OF PHILADELPHIA, PENNSYLVANIA.

IMPROVEMENT IN CAR-STARTERS.

Specification forming part of Letters Patent No. 135,920, dated February 18, 1873.

*To all whom it may concern:*

Be it known that I, JOSEPH B. JONES, of the city of Philadelphia and State of Pennsylvania, have invented certain new and useful Improvements in Starting and Running Cars, of which the following is a specification:

My invention, although applicable to cars of many descriptions, is mainly designed as an auxiliary attachment to street-cars drawn by horses, for the purpose of giving an impulse to the car at the moment of starting after every stoppage, and so relieving the horses in the act of setting the load in motion; or the improved device may be used to exert a continuous propelling force, while the car is going up grade, and the work of pulling unusually heavy for the horses.

In order to apply this propelling mechanism in a manner most convenient for the driver, I have so devised its driving-gear that the same vertical shaft and crank-handle which ordinarily actuate the brake alone, shall also serve to give motion to the running mechanism, and this combination of the two functions of the same crank-shaft is effected without impediment to either of the two uses by the other, and without serious complication of arrangement in detail.

In the annexed drawing forming a part of this specification, Figure 1 is a sectional side view of the portion of a car embodying my invention; Fig. 2 is a plan thereof; and Fig. 3 is an end view of the parts comprised in my invention.

Upon the front axle A of the car, next to the platform occupied by the driver, I provide a loose-fitting wheel, B, gearing with another wheel, C, which works upon a stud, c, Fig. 2, standing vertically at right angles to axle A. Bevel-wheels of the ordinary description might serve in this place; but I use, by preference, the kind of wheels clearly shown in the drawing, in which a series of pins or round teeth projecting from the faces of the two wheels take the place of the ordinary cogs. These pins I make of case-hardened wrought-iron or steel, and they are more durable under the jar and jolting action of the car. $d$, Fig. 1, is a ratchet-wheel, fastened securely on axle A, alongside of the loose wheel B, and with the teeth of this ratchet-wheel $d$ engage a series of weighted pawls, $e$, vibrating on pins $e'$ in the side of wheel B in such a manner that a portion of these pawls, when running in the direction for driving, must, by means of the counter-weights, always drop into gear with the teeth of the ratchet $d$. Now it will be readily seen that as long as the axle A is revolving in the direction of the arrows, Fig. 1, by the pull of the horses alone, the ratchet-wheel $d$ (being fast on the axle) will, in running, simply click over the stationary pawls $e$; but on the other hand, if the wheel B with its pawls $e$ be moved in the direction of the arrow faster than the then maintained speed of the axle, or with the object of starting the axle from a state of rest, it will be evident that the pawls, engaging with the teeth of the ratchet, will become the drivers of the axle, and revolve it with a power and speed proportionate to the force and velocity of the driving-gear. This driving motion is imparted to the wheel B and its pawls through the intervention of a pair of spur-wheels, $f\,g$, working loose on studs $c$ and $h$, $f$ being in one with the wheel C, while the pinion $g$ is attached to a chain-wheel, $i$. This chain-wheel is actuated by a chain, $i'$, from another smaller chain-wheel, $j$, running loosely upon a stud at the front of the platform next to the vertical crank-shaft $k$, from which it is driven by means of a small pair of spur-wheels, $l\,m$. The brake-chain is wound upon a small barrel, $n$, fitted loosely on shaft $k$ by turning this shaft in the opposite direction to that required for actuating the starting mechanism, but is only impelled by the shaft while in gear with a toothed clutch, $o$, which is fast on shaft $k$. A foot-lever, $p$, jointed to a link, $q$, is provided to disconnect the chain-barrel from the clutch $o$ by pressure with the foot on the pad $p'$ of the lever, while a strong spiral spring, $r$, serves to throw the clutches in gear as soon as the lever $p$ is released.

The operation of these several functions of the shaft $k$ is as follows: When turned in the direction to wind up the chain for actuating the brakes, the running-gear is revolved in the opposite direction to the motion of the axle, and the pawls $e$ click over the ratchet-teeth without doing work. Assuming next the shaft $k$ to be turned in the opposite direction for releasing the brake at the moment of starting, a reverse motion in the direction for driving will be imparted to the pawls; and if this motion is to be momentary only, for giving a starting impulse to the car, the desired effect can be produced without unwinding too much chain, and without the need of disconnecting the chain-barrel by the use of the clutch-lever p.

When a continuous propelling motion is to be exerted by the shaft k it is only necessary to keep the foot upon the pad p' as long as this motion is continued, whereby the chain-barrel is disconnected and remains stationary, but ready for immediate function upon release of the foot-lever and reversal of the motion of shaft k.

s is the ratchet-wheel, as ordinarily applied on the brake-shaft, for keeping the brake in action by means of a pawl, s', actuated by the foot. This is only applied when the car remains at rest for a longer period.

It will be evident that the functions of my improved combination will not be impaired by modification of the gearing employed in transmitting motion from shaft k to the axle A, and that such changes of detail are admissible without detracting from the efficiency of my improvement, the arrangement of intermediate gearing described being that which I have deemed best for adoption in practice.

I claim as my invention and desire to secure by Letters Patent—

The combination of the brake-shaft k, clutched chain-barrel n, chain-gear i i' and j, gearing B C, pawls e, ratchet-wheel d, and axle A, substantially as hereinbefore set forth.

JOSEPH B. JONES.

Witnesses:
    THEODORE BERGNER,
    THOS. T. COLLINS.